INVENTOR
FRANK L. LAWRENCE,
BY Ralph L. Barnett
ATTORNEY

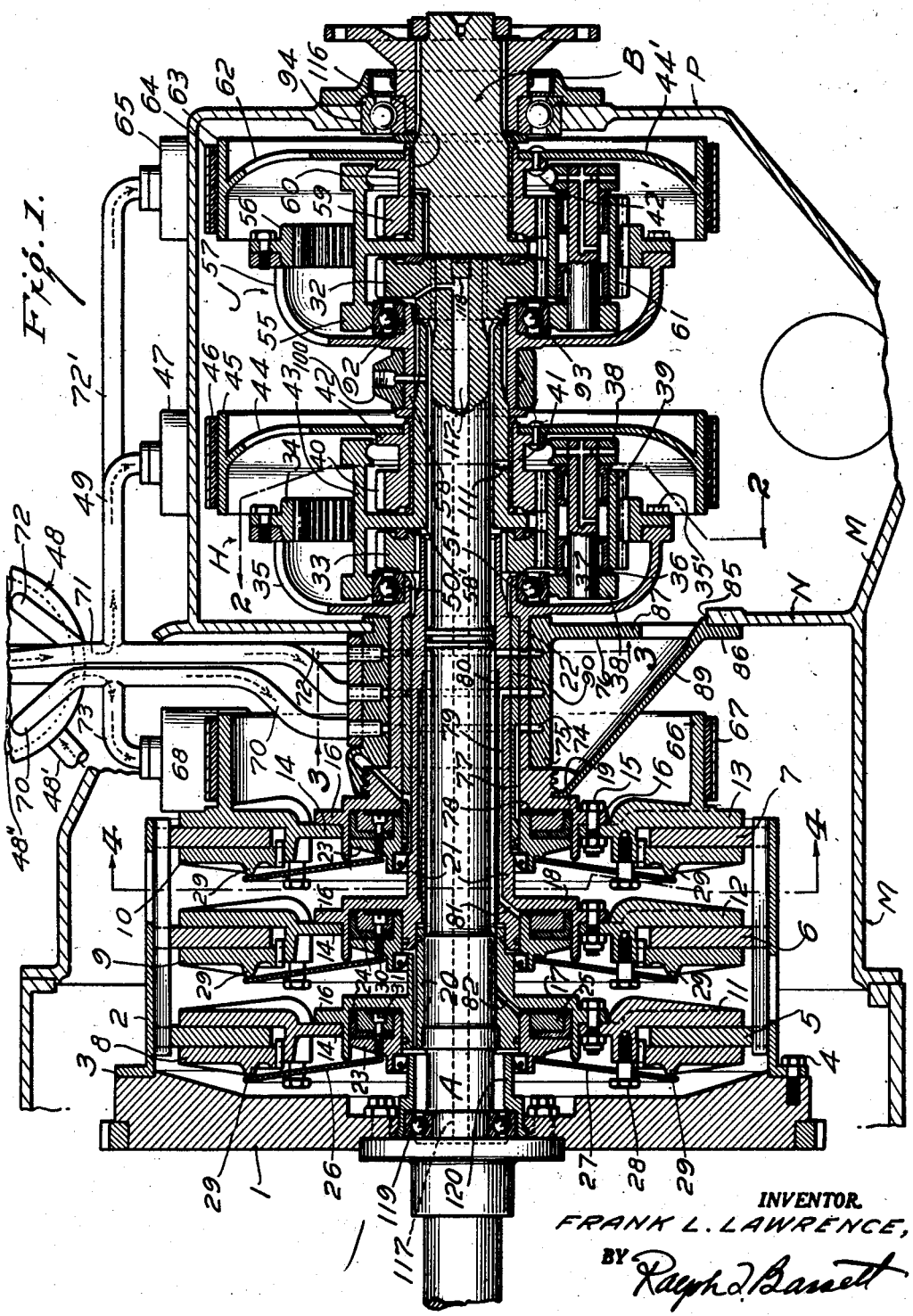

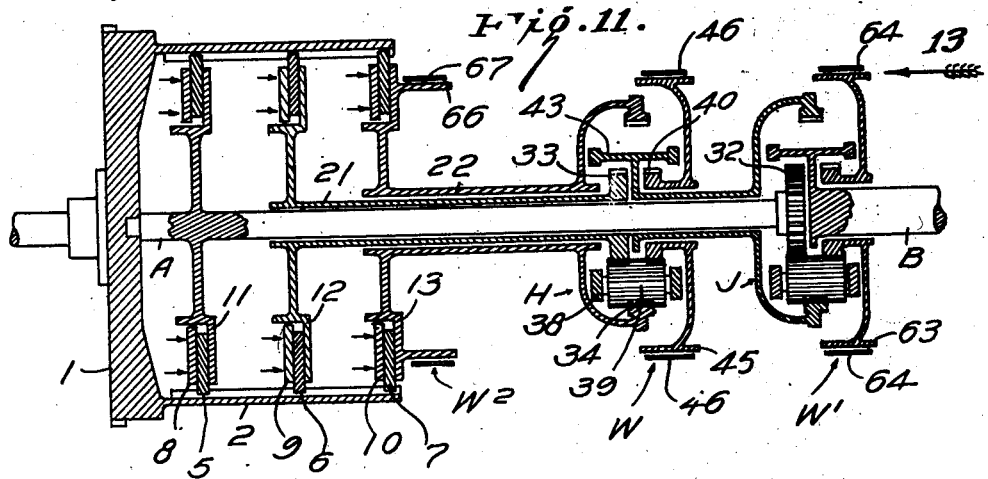

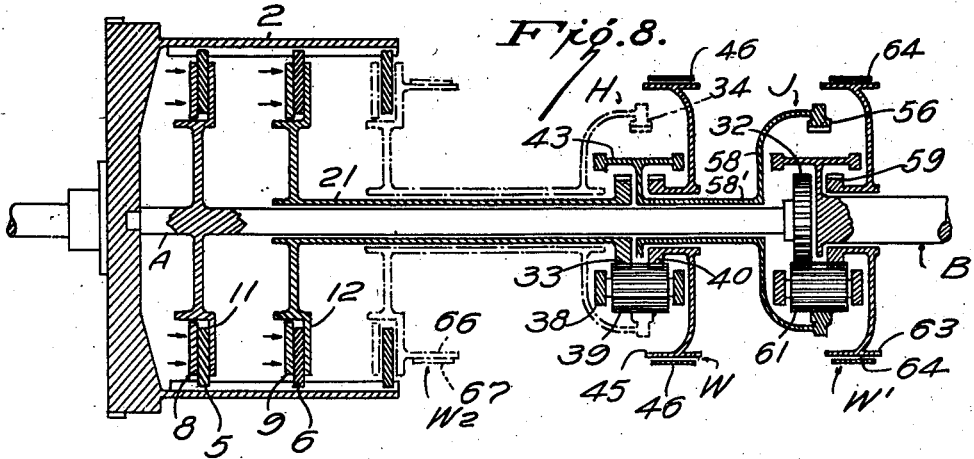
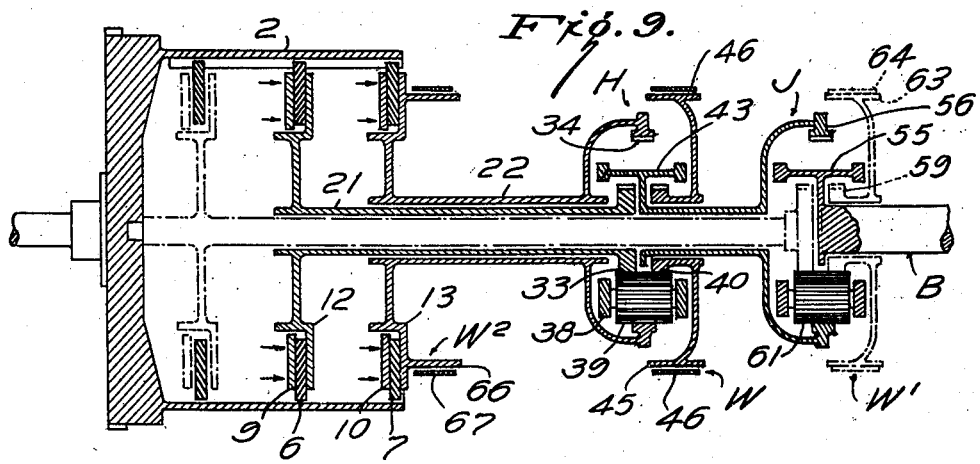
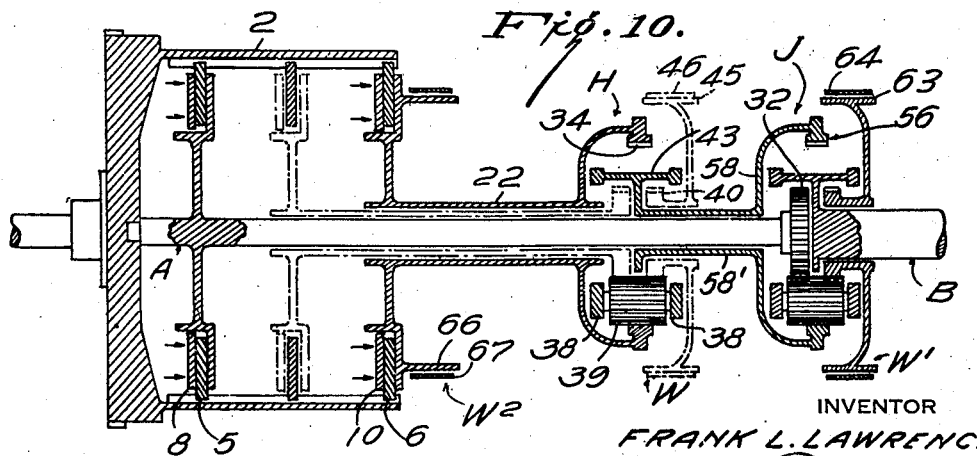

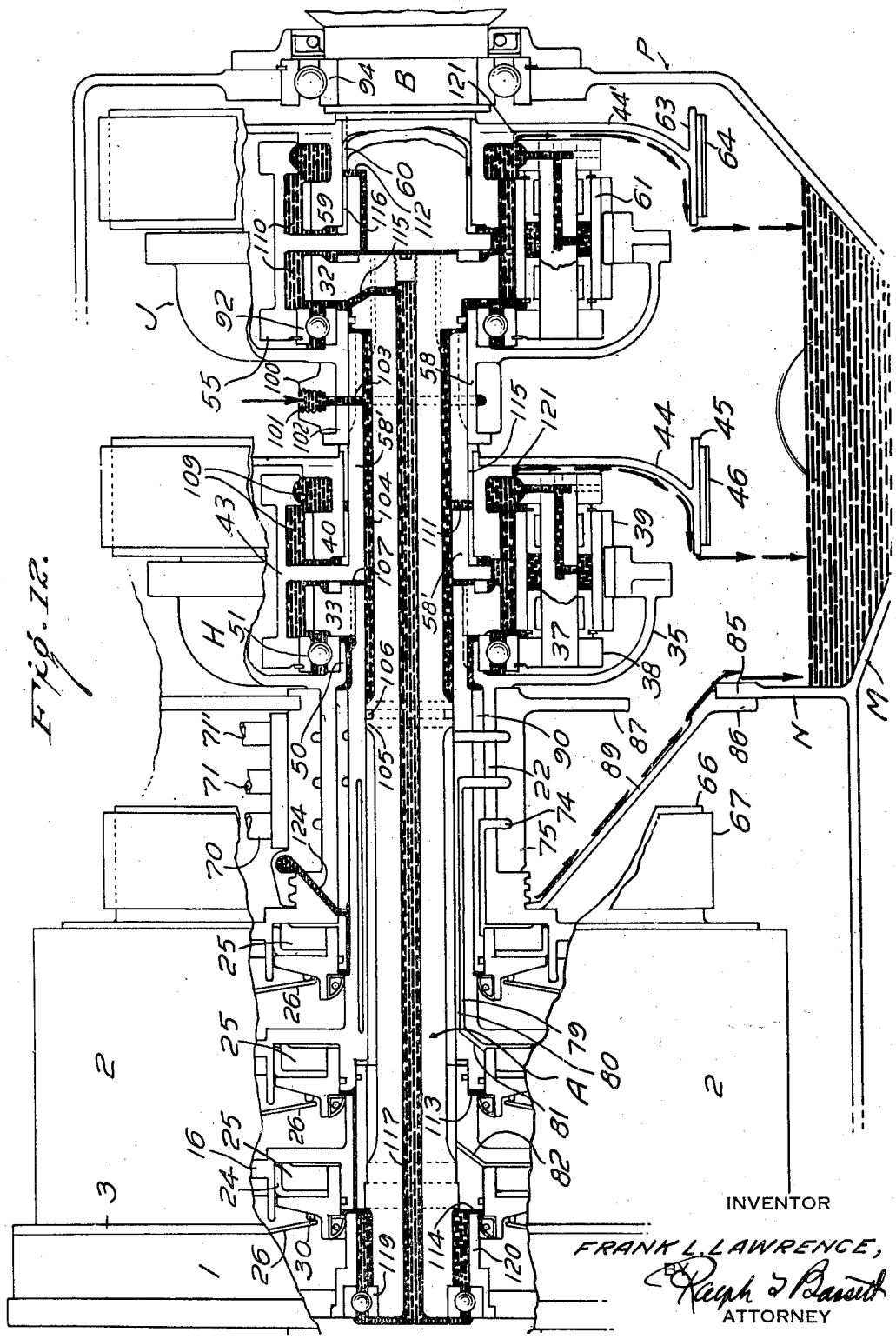

Patented Apr. 5, 1949

2,466,320

UNITED STATES PATENT OFFICE 2,466,320

TRANSMISSION DRIVE ASSEMBLY

Frank L. Lawrence, Renton, Wash., assignor to Pacific Car and Foundry Company, Renton, Wash.

Application May 8, 1945, Serial No. 592,677

14 Claims. (Cl. 74—761)

This invention relates to improvements in planetary transmission assemblies of that type including a plurality of clutches interposed between the planetary elements and the source of power.

One of the objects of this invention is to provide a transmission in which a plurality of planetary assemblies have their individual units driven or locked by means of pre-selected mechanism whereby the gear ratio is variable between the input and the output shafts.

Another object of the present invention is to provide fluid means for controlling the several clutches incorporated in the transmission, this fluid means simultaneously operating through suitable mechanism to lock pre-selected elements of the planetaries of the assembly.

A further object of this invention is to provide means for using liquid to operate the clutches, this liquid being the oil which provides the lubricant for the planetary units and bearings.

A still further object is to provide a novel control of the lubricant both to the clutches and to the gears whereby the oil is available at all times for its dual function.

More specifically this invention comprehends a planetary transmission in which the input and output shafts are aligned and mount both the controlling clutches and the planetary assemblies, these aligned shafts cooperating with concentric tubular shafts to provide passageways for the movement of the controlling fluid and/or lubricant.

This development also provides for the control and partitioning of the fluid so that the portion of the fluid used as a lubricant is separated from that portion of the fluid used in the clutch control mechanism, which latter is maintained at a pressure differential suitable for its function.

Other important features reside in the specific form of clutch structures, the means for operating the clutches, the specific form of planetary assemblies, their relation or association with the clutches, the means for driving or locking the planetary elements and the synchronizing of the entire assembly to provide a single control for developing a predetermined number of gear ratios.

Reference will be had to the accompanying drawings forming a part of this specification and wherein like characters of reference designate corresponding parts throughout the several views, in which—

Figure 1 is a longitudinal vertical section through the entire transmission assembly;

Fig. 2 is a transverse section on line 2—2 of Fig. 1;

Fig. 3 is a transverse section on line 3—3 of Fig. 1;

Fig. 4 is a fragmentary vertical section on line 4—4 of Fig. 1;

Fig. 8 is a vertical section through the assembly diagrammatically illustrating the active elements in providing the fourth speed;

Fig. 9 is a vertical section through the assembly diagrammatically illustrating the active elements in providing the fifth speed;

Fig. 10 is a vertical section through the assembly diagrammatically illustrating the active elements in providing the sixth speed;

Fig. 11 is a vertical section through the assembly diagrammatically illustrating the active elements in providing the seventh speed;

Fig. 12 is a diagrammatic view illustrating the flow of lubricant through the various passageways for lubricating the gear assemblies and bearings and also for supplying fluid pressure for the clutches; and Fig. 13 is a diagrammatic view of the brake control means.

Figure 5:
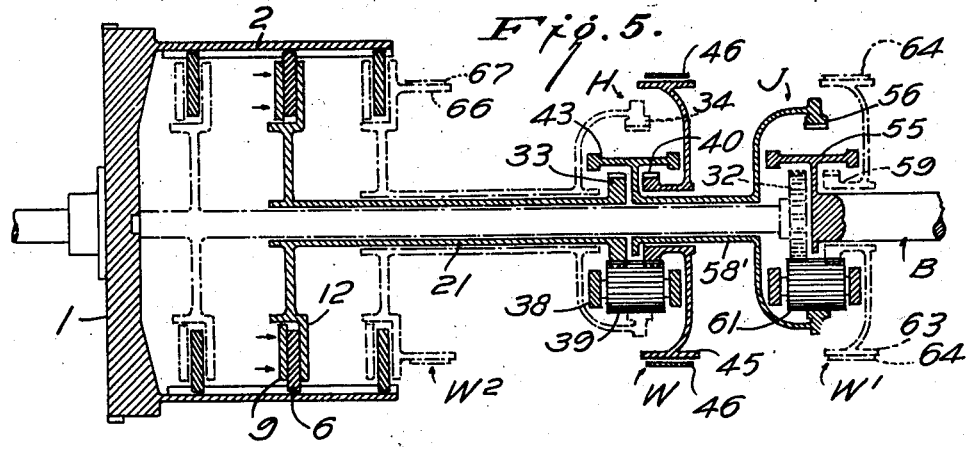
Fig. 5 is a vertical section through the assembly diagrammatically illustrating the active elements in providing the first speed.

The drive is through the fly wheel 1 which is driven from an engine in the usual manner. This drive is in the form of an internally splined member 2 flanged at one end 3 for connection with the fly wheel 1 by the bolts 4 as shown. The internally splined member 2 encloses and drives the clutch friction discs 5, 6 and 7 so that these discs always turn with the driving means. The clutches each include in addition to the friction discs 5, 6 and 7, the annular pressure plates 8, 9 and 10 and the backing plates 11, 12 and 13 respectively. The backing plates 11, 12 and 13 are each generally of disc form and include an annular flange 14 which is secured by bolts 15 to the adjacent annular flanges 16, which flanges 16 extend radially from the clutch cylinders 17, 18 and 19. The cylinders 17, 18 and 19 are each mounted on or formed integral with a hollow shaft, these shafts being indicated generally by the reference characters 20, 21 and 22, respectively. Pistons are arranged in each cylinder, each of identical construction and including a sliding flanged sleeve 23, cup packing 24 and filler ring or clamp plate 25.

For operating the pressure plates 8, 9 and 10 there are provided three buckle plates which transmit the movement of the pistons thereto, these buckle plates being of identical construction, and each including a disc 26, having radial slots 27, as shown more clearly in Fig. 4, the slots radiating from the central opening shown. The buckle plates 26 are fixed in position for operating the three pressure plates by means of the stud bolts 28 which project through the slots and into the backing plates 11, 12 and 13. By this arrangement the buckle plates 26 are adjustably secured in position to perform the desired operation. It will be noted that each of the pressure plates 8, 9 and 10 is formed with an annular projection or rib 29 on its outer face and these projections 29 are engaged by the outer adjacent faces of the buckle plates 26. The inner marginal faces of the buckle plates 26 engage a similar annular projection on each of the pistons 23. By this construction and arrangement the inherent resiliency set-up by the tensioning of the buckle plates 26 between the piston 23, fulcrum means 28 and annular projections 29 cause any motion of the various pistons to be transmitted to the pressure plates for the operation of the clutches and transmission of power from the internally splined member 2 to the various hollow shafts 20, 21 and 22 fixed to or formed integral with the cylinders 17, 18 and 19.

Two planetaries are included in the transmission indicated generally as H and J and each include the usual sun gear, planet unit, and ring gear. It will be noted that the assembly is in line, i. e., the clutches and planetaries are mounted on a common axis as defined by the input shaft A and the output shaft B with the hollow shafts carrying the individual elements mounted on these shafts A and B. The first or outer clutch assembly, which includes the friction plate 5, pressure plate 8 and backing plate 11, is operated by movement of the piston in cylinder 17. The cylinder 17 is formed integral with the hollow stub shaft 20 and the latter is keyed to the input shaft A to drive the sun gear 32 in the planetary J.

The intermediate clutch including friction plate 6, pressure plate 9 and backing plate 12 functions by movement of the piston 23 in the cylinder 18, this cylinder being illustrated as integral with the hollow shaft 21 which drives the sun gear 33 of the planetary H.

The inner end clutch including friction plate 7, pressure plate 10 and backing plate 13 operates by movement of the piston 23 in the cylinder 19, this cylinder being formed, in the present illustration, as integral with the hollow shaft 22 and through this shaft drives the ring gear 34 of the inner planetary H by means of the spider 35 bolted thereto by bolts 35'. It will thus be seen that the various clutches which operate by movement of their respective power cylinders, through the medium of the buckle plates 26, directly drive the shafts A, 21 and 22, and through these shafts the sun gears 32 and 33 of the two planetaries H and J together with the ring gear 34 of the planetary H. Each planetary H and J includes the usual planet unit. The planetary H has a planet unit including the cage 43, the planet gear bearings 36, shaft 37 and shaft supports 38, for each of the planet gears 39. The planet gear 39 is relatively wide to permit meshing of the sun gears 33 and 40, the latter having a hub 41 and flange 42, by means of which it is suitably fastened by bolts or rivets 42' to the disc 44 of the brake drum 45. A brake band 46 operated by fluid pressure within a cylinder, shown at 47, (see Fig. 13) is selectively operated by control valve 48 as will be more clearly hereinafter described.

The output shaft B is fixed to or formed integral with the cage 55 of the planetary assembly J. This planet assembly includes the ring gear 56 bolted to the spider 57 and the hub 58 of the spider 57 is fixed to the hollow shaft 58' which carries the cage 43 of the planet assembly H. A spur gear 59 on the hub 60 forms one of the two sun gears for the planetary gears 61, the other spur or sun gear being mounted on the input shaft A and being indicated by reference character 32. The spur or sun gear 59 is fixed to and carries the brake wheel 62, the brake wheel 62 including the brake drum 63 which is associated with the brake strap 64 as is conventional in such cases (see Fig. 13). By this arrangement the operation of the mechanism in the brake control cylinder 65 releases the normally gripping brake strap 64 to permit the rotation of the brake wheel 63 whereby the sun gear 59 is free on the output shaft B.

A brake drum 66 is fixed to the backing plate 13 of the inner clutch assembly and this brake drum 66 is locked by use of the brake strap 67 through operation of the brake cylinder 68 (see Fig. 13).

Normally each of the brake bands 67, 46 and 64 are urged to operative position by the spring shown diagrammatically at 70 in Fig. 13, whereby the three brake elements 66, 45 and 63 are normally held locked. Each of the brake drums 66, 45 and 63 are directly associated with one of the three clutches, i. e. due to the fact that the operation of the clutch is only permissible by release of its associated brake, these brakes are actuated automatically and through the same fluid actuated means as that actuating the three clutches. The clutch assembly including the friction plate 5, backing plate 11 and clutch plate 8 is operated through its fluid piston to drive the shaft A, and the operation of this shaft is associated with the planetary J, and variation in gear ratios is brought about by the release of the brake strap 64 from its drum 63. The operation of the strap 64 is by means of the control mechanism in brake cylinder 65. In the same manner the intermediate clutch, including the friction plate 6, backing plate 12 and clutch plate 9, is operated through its fluid motor in association with the operation of the brake strap 46 on the brake drum 45, the motor for this operation of the brake strap 46 being indicated by reference character 47. The clutch embodying the friction plate 7, backing plate 13 and clutch plate 10 is operated by its concentric fluid motor and the brake 66—67 is associated with this latter clutch assembly so that the operation of the clutch and brake is simultaneous.

Referring to Fig. 1 it will be seen that the fluid control means 48 controls three fluid passages 70, 71 and 72 and each of these fluid passages includes a shunt pipe. The fluid passage 70 which operates the motor for actuating the clutch assembly 7, 10 and 13 is provided with the by-pass 73 which opens into the brake control cylinder 68. Thus upon movement of the control head 48 fluid is admitted through the pipe 70 and by-pass 73, the fluid through the pipe 70 operating the clutch 7, 10 and 13 and simultaneously the brake 67 so that as the clutch is caused to engage by operation of its fluid motor the brake is at the same time released to permit movement of the associated parts through the drive 1 and 2. The same operation includes each of the clutch and brake units and by this means the three brakes are normally locked to provide the establishment of necessary reactance for the proper predetermined gear ratios. When a change of drive ratio is desired it will be apparent that the operaiton of a single valve selectively provides for the operation of the desired clutch and the braking of certain elements of the involved planetaries.

Provision is made for the passage of fluid from the control 48 to the respective clutches. The fluid for the operation of the clutch which includes the elements 7, 10 and 13 is through the pipe 70 from the control head 48 into the annular port 74 in the bushing 75, to be hereinafter described. The operating fluid passes from the annular groove 74 through the longitudinal passageway 77 into lateral port 78 and against the reciprocating piston in the fluid motor chamber which constitutes the center portion of the inner clutch assembly. The fluid for the intermediate clutch which includes the elements 6, 9 and 12 is through the pipe 71 from the head 48 forwardly through the annular passageway 79 formed by the sleeve 80 seated within the hollow shaft 21 and out the lateral port 81 to the concentric motor of the central clutch. For the operation of the clutch including elements 5, 8 and 11 the fluid is fed through pipe 72 and through the passageway defined by the inner surface of the sleeve 80 and the outer surface of the reduced portion of shaft A forwardly through the lateral port 82 into the fluid motor cylinder. Each of the pipes 70, 71 and 72 is connected with a by-pass or branch pipe for supplying fluid to a brake pressure chamber, the branch pipe 49 providing fluid for the pressure chamber 47 from the pipe 71, the pipe 72' providing fluid for the brake cylinder 65 from the fluid passageway 72 which feeds the fluid to the outer clutch cylinder, while branch pipe 73 supplies pressure to the control 68 from its main conduit 70.

The mounting of the transmission assembly comprehends the casing M partitioned at N and having outer end wall P. The partition N is formed with a medial opening 85 in which the supporting casting 86 is arranged, this casting 86 embodying a flange for connection with the partition N and an overlapping flange 87 which rests on the wall defining the central opening 85 in the partition N. The casting as heretofore pointed out includes the vertical wall 76 and a hub structure 75, the latter having a central bore sufficient to receive the input shaft A, the hollow shafts 21 and 22 and cooperating bushings. A dished drip plate 89 is cast integral with the supporting structure to facilitate the discharge of the oil from one side of the partition N to the other as will be hereinafter pointed out.

The entire assembly is supported by means of a plurality of bearings, each bearing supporting a predetermined structure and facilitating the distribution of the load to the maximum. The main supporting structure is the hub 75 which is fixed to the partition N of the main casing. This hub directly supports the hollow shaft 22 driven by the inner clutch assembly 7, 10 and 13 and as heretofore pointed out this hollow shaft 22 carries and drives the spider 35 and with it the ring gear 34 of the planetary assembly H. Within the hollow shaft 22 is the bushing 90 suitably ported and grooved for the passage of the operating fluid and lubricant. The sleeve 90 is inset in the inner wall of the hollow shaft 22 and provides a supporting surface for the hollow shaft 21 driven by the intermediate clutch and carrying at its inner extremities the sun or spur gear 33 of the planet unit H. The hollow shaft 21 has its inner face reduced for a substantial distance medially of its structure and is shouldered at one end to provide for the reception of the sleeve 80. The sleeve 80 is spaced normally from the inner cut-out portion of the wall of the hollow shaft 21 to provide a passageway for fluid and this sleeve is spaced from the input shaft A to provide a further passageway between its inner wall and the shaft for the passage of the fluid for the outer clutch. These passageways have heretofore been described. The hollow shaft 22 is formed with the annular flange extension 50 upon which the bearings 51 are mounted, these bearings 51 forming raceways for the cage extension 38 of the planetary assembly H. The hub 58' which is an integral part of the cage 43 has at its output end the spider 57 fixed thereto and this spider is flanged at 92 for the mounting of the ball assembly 93 upon which the cage 55 of the planetary assembly J travels. The end wall P of the casing is formed with an opening for the bearing 94 within which the output shaft is mounted.

The various speeds provided by this transmission are illustrated in Figs. 5–11 inclusive. In Fig. 5 there is illustrated diagrammatically, and with the active gears hatched, the clutch elements, the driving connections and the planetary elements operating to provide the first speed which in the present structure is designed to furnish a gear ration of 4½ to 1. In this Fig. 5 it will be noted that the intermediate clutch which includes elements 6, 9 and 12 is being driven from the source of power through the internal drive 2. This clutch drives the tubular shaft 21 and through this shaft the sun gear 33. The sun gear 33 rotates the planet until 43 with its planet gears 39 and also the planet pinion 40 which is free to rotate by virtue of the off position of the brake 46. The planet unit 43 rotating drives the ring gear 56 through the tubular shaft connection 58', this ring gear rotating the planet unit 55 which is fixed to the end of the output shaft B. The ring gear 34 of the planet unit H is locked by virtue of the brake 67 providing a reactance for this unit. In the unit J the reactance is provided by the sun gear 59 locked by the brake 64.

Figure 6:
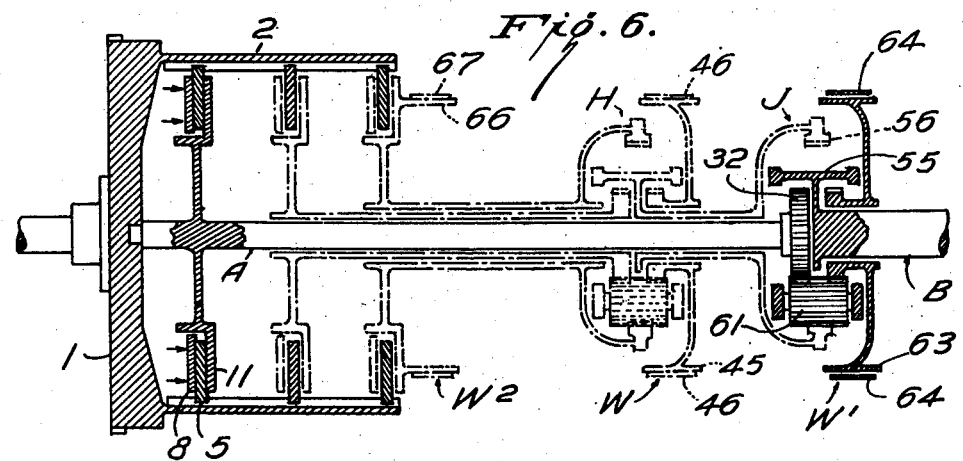
Fig. 6 is a vertical section through the assembly diagrammatically illustrating the active elements in providing the second speed.

For the second speed, and referring to Fig. 6, the drive is through clutch 5—8—11, which drives the main input shaft A, the latter carrying the spur or sun gear 32 of the planetary assembly J. The planet gears 61 revolve with their cage about the sun gear 32 as the ring gear 56 is locked and operates as the reactance in the assembly due to the brakes W and W² being in their normal or braking position. The cage 55 is fixed to the output shaft and drives this output shaft B at a ratio of 3 to 1 with the present disclosure.

Figure 7:
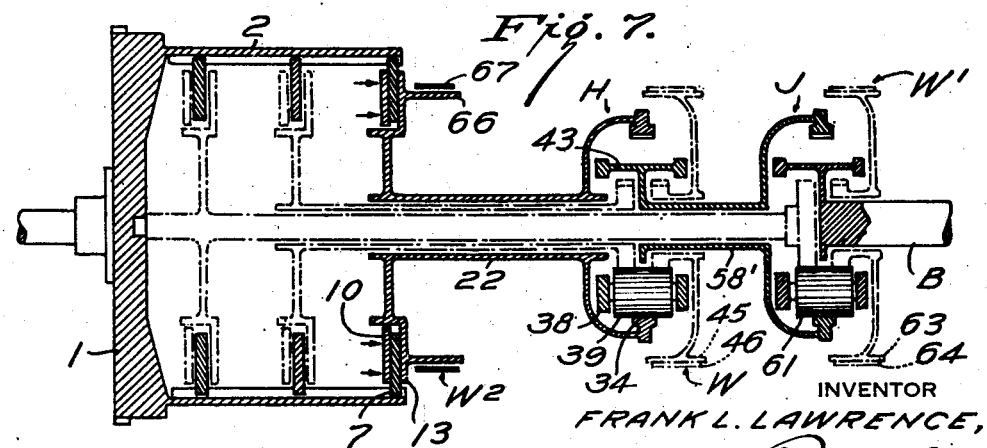
Fig. 7 is a vertical section through the assembly diagrammatically illustrating the active elements in providing the third speed.

The third speed illustrated by Fig. 7 is through the power to flywheel 1, internal member 2 and the inner clutch embodying elements 7—10—13. This inner clutch is freed for rotation by releasing the brake elements 66 and 67 of brake assembly W². The tubular outer shaft 22 is driven from clutch 7—10—13, driving ring gear 34 of planetary assembly H. The sun gear 40 being held by brake W becomes the reactance and planet cage 43 and the pinions 39 rotate, carrying the shaft 58' and the ring gear 56 of planetary assembly J. The sun gear 59 is locked by the brake elements 63 and 64 of the brake unit W' and thus the cage 55 revolves with its planets 61. The cage 55 being fixed to the output shaft B drives the latter, the ratio being 2¼ to 1.

The operation of the fourth speed with a ratio of 1.8 to 1 is illustrated in Fig. 8. To obtain this ratio the first two clutches including units 5—8—11 and 6—9—12 are driven by the gear 2 from the source of power. The first or outer clutch having elements 5—8—11 drives the main shaft A and the spur or sun gear 32 of planetary assembly J. The second or intermediate clutch with elements 6—9—12 drives the spur or sun gear 33 of planetary assembly H. Reactance in unit H is by virtue of the locked ring gear 34, this gear being held by brake $W^2$ including elements 66 and 67. The cage 43 of planetary assembly H rotates and with this cage, shaft 58' and ring gear 56 rotate.

The rotation of ring gear 56 and sun gear 32 of planetary assembly J rotates the cage 55 and the output shaft B at the ratio indicated.

The fifth speed is shown in Fig. 9, the drive being through the intermediate clutch having elements 6—9—12 and the inner clutch having elements 7—10—13. Driving these two clutches rotates the tubular shafts 21 and 22 thus driving the sun 33 and ring 34 of planetary assembly H. The cage 43 of this assembly thus rotates to carry the ring gear 56 of planetary assembly J. The sun gear 59 is locked by its brake W' having elements 63 and 64 thus causing the cage 55 and the planets 61 to rotate with the output shaft B at a ratio of 1½ to 1.

In Figure 10 the sixth speed is shown, the drive being through the inner and outer clutches having elements 5—8—11 and 6—10—13 respectively. The clutch 5—8—11 drives the main input shaft A and the sun gear 32 of planetary assembly J. The inner clutch 6—10—13 drives the ring gear 34 of the planetary assembly H. The sun gear 40 of assembly H is locked by its brake W having elements 45 and 46 providing the reactance for this unit and causing the cage 43 and its planet gears 39 to rotate and thus drive the shaft 58' and the ring gear of planetary assembly J. Thus in the planetary J the ring gear, sun gear, and planet unit all rotate providing the speed ratio of 1.29 to 1 for the output shaft B.

For the seventh speed at a ratio of 1 to 1 all clutches function and all brake elements are free to eliminate a reactance in the planetary assemblies. This is illustrated in Fig. 11.

Referring particularly to Figs. 1 and 12, the fluid system which comprehends not only the lubrication of the parts but also furnishing fluid pressure for the operation of the clutches is fully set forth.

In the assembly it is necessary to lubricate all bearings, and the planetary assemblies. The fluid for lubricating the bearings and the planetaries is fed by any suitable system into the collar 100 which is provided with a threaded opening 101, this opening extending through the hub 102 which carries the spider 57, and the ring gear 56 as shown in Fig. 1. The lubricant passes through the hub 102 and through a port 103 in the hollow shaft 58' of the planet cage 43 into the channelway 104 formed by reducing the diameter of the input shaft A from a point medially of its length towards the output shaft B. The input shaft A is provided with the medial enlargement 105 having a packing ring 106 for limiting the movement of the lubricating material entering the intake opening 101 so that this lubricant is sealed from access to ports hereinafter described and which latter ports form the communicating means for supplying fluid to the several clutches from the clutch control head 48. The lubricant entering the opening at 101 fills the channelway 104 and through the radial passageways 107 and 111 furnish the lubricant contained in the planetary assembly H as shown at 109. A port 111 supplies lubricant from the planetary H to the bushing 115 to provide lubricant for same. The input shaft A is formed with a central longitudinal passageway 117, plugged at its output end by plug 118 but open at its other end to receive the lubricant escaping from the first two clutch operating motors, through the channelways 113 and 114. The lubricant from these motors is discharged through the central passage 117 into the planetary assembly J through the port 115, being by-passed from this planetary assembly through port 112 to lubricate the bearing 116. The lubricant from the planetaries H and J and bearings 115 and 116 escapes through ports 121 against the concave adjacent sides of the brake wheels 44 and 44' to discharge into the sump. Lubricant from the inner clutch motor which by-passes the piston discharges through the port 124 onto the pan 89 for discharge into the sump.

As hereinafter described the control head 48 regulates the discharge of lubricant furnished to this head under pressure, to the various clutches and brake motors.

By the arrangement shown it is possible to attain the seven speeds set forth above, each speed being attained from a single control head indicated generally by reference character 48 and which control head is in the nature of a multi-way valve including a ported valve body 48''. The valve 48'' can be rotated or reciprocated by any suitable means and the shifting of this valve will admit fluid under pressure through the pipe 48' to any one or two or three of the pipes 70, 71 and 72. Thus any combination of clutch operation and brake release will be available to furnish the suitable clutch driving connection and the related brake release to secure the operation of the necessary reactance members and thus provide the predetermined drive ratio from the source of power to the output shaft B. The various operations are illustrated in Figs. 5-11 inclusive, these figures illustrating the brakes which are in operative position for the various speeds.

In Fig. 12 the flow of the lubricant is illustrated, this figure also showing the intermediate packing 106 which defines the limit of movement of the lubricating fluid with respect to the main shaft A.

It will be noted that suitable bearings are provided, which bearings are lubricated from the same common source as the planetary units. It will also be noted that the flow of the lubricant in the clutch assembly for the operation of the several clutches embodies the use of packing elements between the three fluid pistons of the clutches and the shaft connections between these clutches and the planetaries.

The various clutches may be adjusted for operation at predetermined pressure by the adjustment of the buckle plates 26, the adjustment of these plates also determining the degree of frictional engagement in the various clutch assemblies.

The provision of essential fluid pressure for supplying the lubricant to the bearing surfaces and the provision of the necessary pressure from the fluid line to the control head for the operation of the clutches comprehends an invention distinct from the invention of the present application.

What I claim is:

1. In a power transmitting assembly, a series of concentric input shafts each driven through a fluid-actuated clutch, a plurality of planetary assemblies axially arranged with respect to the input shafts, said planetary assemblies each including a pair of sun gears, planet units, and ring gears, one element of each planetary assembly being directly driven by one of said input shafts fluid-operated means for selectively operating the clutch elements, means for selectively locking a sun gear of each planetary assembly against rotation, and fluid-operated means for selectively unlocking said sun gears.

2. In a power transmitting assembly, a series of concentric input shafts each driven through a fluid-actuated clutch, a plurality of planetary assemblies axially arranged with respect to the input shafts, said planetary assemblies including sun gears, planet units, and ring gears, fluid-operated means for selectively operating the clutch elements, means normally locking said sun gears against rotation, and fluid-operated means for selectively unlocking pre-selected sun gears of the planetary assemblies simultaneously with the operation of pre-selected clutches.

3. In a power transmitting assembly, a series of concentric input shafts each driven through a fluid-actuated clutch from a common source of power, a plurality of planetary assemblies axially arranged with respect to the input shafts, said planetary assemblies each including sun gears, a pair of planet units and ring gears and at least one of the elements of each planetary assembly being directly driven by one of said input shafts, means for positively driving one element of one planetary assembly by an element of the adjacent planetary assembly, and means for selectively locking and unlocking at least one sun gear of each planetary assembly.

4. In a power transmitting assembly, a series of concentric input shafts each driven through a fluid-actuated clutch from a common source of power, a plurality of planetary assemblies axially arranged with respect to the input shafts, said planetary assemblies each including a pair of sun gears, a pair of planet units and a ring gear, and one planet of each planetary assembly being directly driven by one of said input shafts, a brake means for one element of each sun gear assembly and one ring gear of one assembly, said brake means being normally effective to lock its planetary element against rotation and fluid means for selectively operating said clutches and simultaneously releasing one of said brakes.

5. In a power transmitting assembly, a series of concentric input shafts each driven through a fluid-actuated clutch from a common source of power, a plurality of planetary assemblies axially arranged with respect to the input shafts, said planetary assemblies each including at least one sun gear, a planet unit and a ring gear, and one element of each planetary assembly being directly driven by one of said input shafts, means for locking at least one sun gear of each planetary assembly, and means for actuating said locking means simultaneously with the operation of pre-selected clutches for varying the gear ratio to an output shaft.

6. In a power transmitting assembly, a plurality of concentric shafts, a main shaft axially arranged within said concentric shafts, an output shaft, said concentric shafts each including hub portions formed with annular chambers constituting power cylinders, fluid-operated pistons within said power cylinders, annular flanges extending radially from said power cylinders, fixed clutch elements secured to each of the flanges, friction plates for said clutches, and pressure plates for operating said friction plates, disc-shaped buckle plates for transmitting motion of the pistons to said pressure plates, means for driving the friction plates of each clutch from a single source of power, planetary assemblies axially arranged on the main shaft and each including a sun gear, a planet unit and a ring gear, means driving one element of each planetary assembly by one of said concentric shafts, means for selectively locking a sun gear of each planetary assembly against rotation, and means for pre-selectively releasing a locked planetary element simultaneously with the operation of pre-selected clutches.

7. In a power transmitting assembly, a series of concentric input shafts each driven through a fluid-actuated clutch from a common source of power, a plurality of planetary assemblies axially arranged with respect to the input shafts, said planetary assemblies each including at least one sun gear, a planet unit and a ring gear, and one element of each planetary assembly being directly driven by one of said input shafts, means normally locking at least one sun gear of each planetary assembly, and means for releasing said locking means simultaneously with the operation of pre-selected clutches for varying the gear ratio to an output shaft.

8. In a power transmitting assembly, a casing including a medially arranged partition having a central opening, a hub structure supported by said partition and including an angular fluid deflector plate positioned below the hub for deflecting fluid from one side of the partition to the other, an input shaft extending through the hub, an axially arranged output shaft, planetary units supported at one side of the partition on said input shaft, one of the planetary units including an element fixed to the output shaft, means for selectively locking a sun gear of each assembly and a ring gear of one assembly of each planetary unit against rotation, fluid operated means for releasing said locking means, a series of fluid-actuated clutches mounted on the input shaft at the other side of the partition and including fluid-actuated pistons arranged in power cylinders, means for transmitting movement of said pistons to said clutches to operate the same, means for driving one element of each planetary unit through one of said clutches, fluid ducts connecting the hub with said power cylinders and means for feeding fluid to said cylinders through said hub to operate pre-selected clutches and simultaneously feeding fluid to the fluid-operated lock releasing means.

9. In a power transmitting assembly, a casing including a medial wall defining a clutch chamber and a gear box, the gear box providing an oil sump, a hub supported by said wall, a deflector plate attached to said hub for deflecting fluid from the clutch chamber to the gear box, an input shaft extending through said hub, an output shaft, a series of concentric hollow shafts arranged on said input shaft each including hub portions formed with power cylinders, pistons in said power cylinders, clutches carried by each of said hubs and operated by the pistons in said power cylinders, said clutches each including a friction plate and said friction plates each being driven from a common source of power, axially arranged planetary assemblies arranged in said gear box, said planetary assemblies each including at least one sun gear, a planet unit and a ring gear, a sun gear and a ring gear of one planetary assembly being directly driven by the hollow shafts mounted on the input shaft and carrying clutch assemblies, the sun gear of the second planetary assembly being driven by the input shaft, means connecting the planet unit of the second planetary assembly with the output shaft, means for driving the ring gear of the second planetary assembly by the planet unit of the first planetary assembly, fluid released means normally locking one element of each planetary assembly, ducts connecting said hub with the power cylinders of the clutch assemblies and means feeding fluid under pressure to said ducts to selectively operate said clutches, said means also releasing pre-selected planetary lock means.

10. In a power transmitting assembly, a casing having an upright wall defining a clutch chamber and a gear box, a hub supported by said wall, an input shaft mounted in said hub, an output shaft, a plurality of clutches arranged on the input shaft within the clutch chamber, a plurality of planetary gear assemblies arranged in the gear box on said input shaft, a tubular driving connection between each of the clutches and at least one element of one planetary assembly, said tubular driving connection having a reduced area, a tube arranged about the reduced area of the driving connection and spaced therefrom to form a fluid passageway, a common source of power for driving the input shaft through said clutches, a driving connection between one element of one planetary assembly and the output shaft, means for locking one element of each planetary assembly, fluid means for selectively operating each of the clutches and each locking means, an oil sump in the gear box forming an oil reservoir, means for feeding oil from said reservoir under pressure through said fluid passageway to said fluid means, an oil control head for controlling the flow of fluid under pressure to said fluid means, an oil pressure storage tank, means for forcing oil from said sump to the oil control head, and means for discharging the oil escaping in the clutch chamber to the sump in the gear box.

11. In a power transmitting assembly, a casing, a wall in the casing supporting a hub, an input shaft aligned axially within said hub, a series of tubular shafts mounted on the input shaft and extending through said hub, hubs formed at one end of each tubular shaft and including annular power chambers, annular pistons arranged in each power chamber, clutches carried by each hub, means for operating the clutches by the said pistons including disc-shaped buckle plates, said buckle plates being formed with a series of radial slots terminating in a central opening formed in each of said plates, adjustable means extending through said slots for varying the tension of said plates, planetary assemblies arranged on said input shaft, said planetary assemblies each including a pair of sun gears, means for driving one element of each planetary assembly through one of said clutches, means for locking one element of each planetary assembly against rotation, means driving the output shaft by one element of one planetary assembly, and means for synchronizing the operation of the locking means with the operation of the clutches for varying the gear ratio between the input shaft and the output shaft.

12. The substance of claim 11 characterized in that one of the elements of one of the planetary assemblies is driven directly by the adjacent clutch.

13. The substance of claim 11 characterized in that one of the elements of one of the planetary assemblies is driven directly by the adjacent clutch, and means are provided for locking one of the movable parts of said clutch against rotation.

14. In a power transmitting unit, a driving element, a plurality of concentric input shafts, means for transmitting power from the driving element to each of the input shafts selectively, a plurality of planetary gear trains, each including a sun gear, a ring gear, planet pinions, a cage supporting said planet pinions, at least one element of each planetary train being operably associated with one of the input shafts, the planetary cage of the first gear train being fixed to a hollow shaft, and said hollow shaft being fixed to the ring gear of the next planetary, and the other planetary cage being fixed to the output shaft, a plurality of brakes to selectively lock certain of the gears from rotation, and means to impart power selectively to any one or more of the input shafts to cause the output shaft to rotate at a predetermined ratio in relation to rotation of driving element as determined by the selective locking of said gears.

FRANK L. LAWRENCE.

REFERENCES CITED

The following references are of record in the file of this patent:

UNITED STATES PATENTS

| Number | Name | Date |
|---|---|---|
| 2,003,212 | Millican | May 28, 1935 |
| 2,194,954 | Ravigneaux | Mar. 26, 1940 |
| 2,259,730 | Burtnett | Oct. 21, 1941 |
| 2,319,549 | Lawrence | May 18, 1943 |